Figures 1, 2:
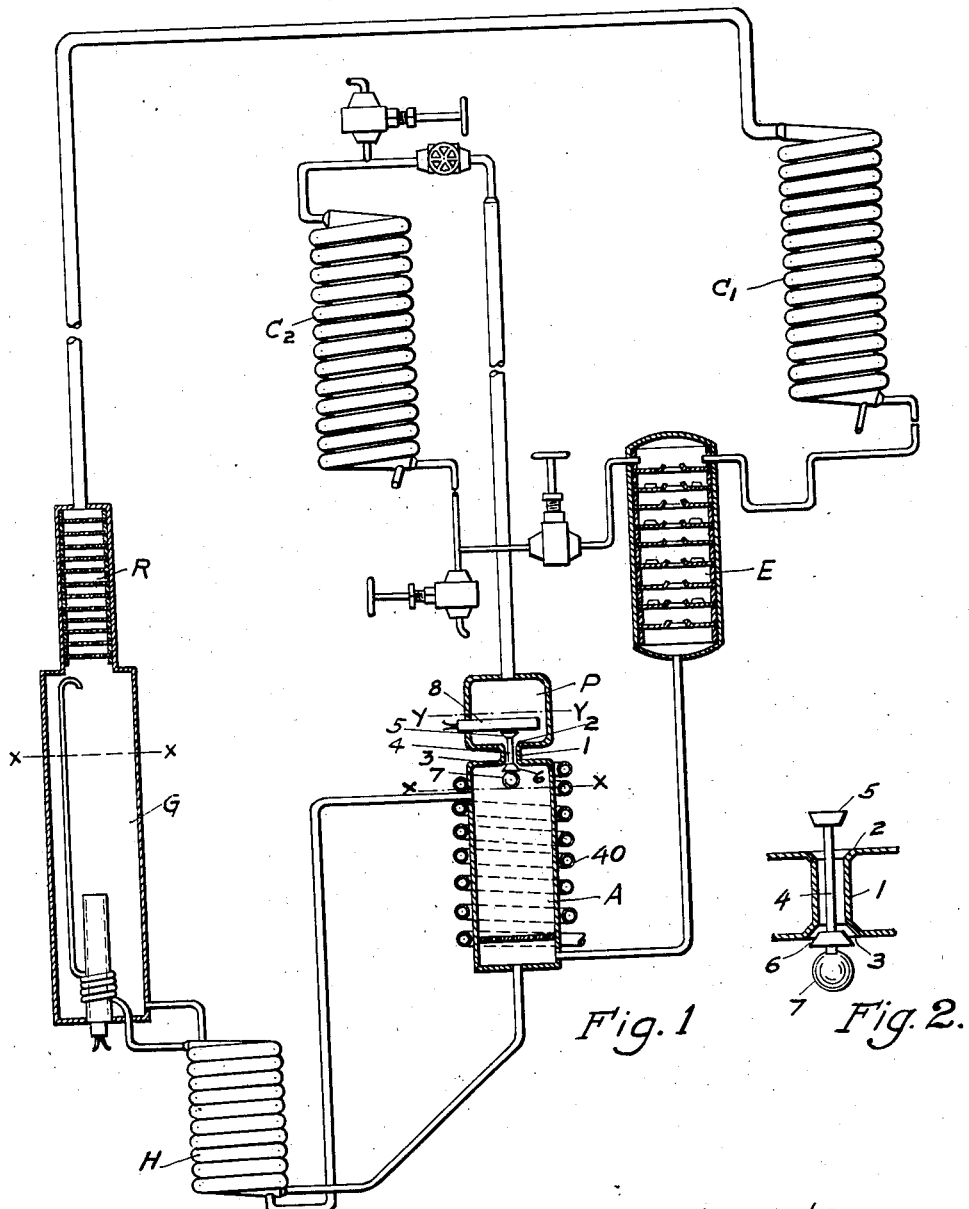

March 27, 1934.  R. S. NELSON  1,952,214
ABSORPTION REFRIGERATING APPARATUS
Filed May 7, 1932

Inventor
Rudolph S. Nelson
Harry S. Duarse,
Attorney

Patented Mar. 27, 1934

1,952,214

UNITED STATES PATENT OFFICE 1,952,214

ABSORPTION REFRIGERATING APPARATUS

Rudolph S. Nelson, Rockford, Ill., assignor to The Hoover Company, North Canton, Ohio., a corporation of Ohio Application May 7, 1932, Serial No. 609,790

12 Claims. (Cl. 62—119.5)

This invention relates to the art of refrigeration and more particularly to the absorber or separator employed in continuously operating absorption refrigerating systems in which a plurality of refrigerants are employed.

The present invention relates to improvement in apparatus of the type disclosed in my Patent #1,822,109 issued September 8, 1931, for "Method of and apparatus for producing refrigeration." As disclosed in this patent it is old to employ two refrigerants, such as ammonia and propane in a single refrigerating system. In a system of this nature, both refrigerants evaporate in a single evaporator and it is necessary to separate them after they have evaporated so that they may be separately condensed and again be fed into the evaporator.

Separation of the refrigerants may be effected by causing one to be absorbed and the other condensed, the two liquids then separating due to gravity action upon them. The refrigerants may then be converted to their vapor phases by the application of heat to the solution and condensed refrigerant separately. As disclosed in my patent aforesaid, after the auxiliary refrigerant has been separated from the main refrigerant in this way, it may be vaporized by applying heat to the upper part of the absorber. This requires a very careful regulation of the heat input to the boiler and the exercise of care in regulating the circulation of solution through the absorber. Even when care is exercised in these respects the apparatus sometimes goes out of operation temporarily due to fluctuations of liquid level in the boiler and absorber resulting from slight changes in temperature or pressure in these vessels or other parts of the system.

An object of the present invention is to prevent such variations in liquid level from adversely affecting the operation of the system.

A further object is to provide an arrangement for effectively separating two refrigerants without the necessity for the careful regulation of heat inputs to the system, and the careful control of the amount of solution circulated through the absorber.

Other objects and advantages reside in certain novel arrangements and construction of parts as will be apparent from the following description taken in connection with the accompanying drawing in which:—

Figure 1 is a diagram of an absorption refrigerating system parts of which as shown in cross-section and illustrating one form of apparatus adapted to carry out the principles of the invention; and Figure 2 is an enlarged cross-sectional view of a portion of the apparatus of Figure 1.

Referring to the drawing the system there shown is similar to the one shown in my Patent 1,822,109. It consists of a generator or boiler G, a rectifier R, condensers $C_1$ and $C_2$, evaporator E, an absorber or separating vessel A, a small auxiliary vessel P which may be integral with the absorber A, a heat exchanger H and various conduits for connecting these vessels as shown.

The novelty of the present invention resides in the absorber A, the auxiliary vessel P, the means connecting these elements and the manner in which these parts cooperate with one another.

The absorber A is so constructed that as the gaseous mixture of refrigerants is fed into the lower portion thereof, one refrigerant is absorbed and the other condensed. If the condensed refrigerant has a different specific gravity and is immiscible with respect to the absorption liquid stratification will occur under the action of gravity. Thus, where ammonia and propane are used as refrigerants and water as the absorption liquid, the ammonia will be absorbed by the water and the propane will condense and float on top of the solution.

A small section of pipe designated 1 connects the upper portion of the absorber A to the lower portion of the vessel P. The upper and lower ends of this section of pipe are provided with valve seats as indicated at 2 and 3. A valve stem 4 is mounted in the pipe 1 and carries a valve 5 at its upper end and a valve 6 at its lower end. A float member which may be in the shape of a ball as indicated as 7, is integrally connected with the valve stem 1, so as to control the operation of the valves. The valve assembly (that is, the stem 4, the valves 5 and 6 and the float member 7) has sufficient weight to cause the same to move to its lower position so that the valve 5 is closed when the assembly is immersed in liquid propane. The valve assembly is light enough, however, to cause the same to move to its upper position with the valve 6 closed when the float member 7 is immersed in absorption liquid, such as a solution of ammonia in water. This arrangement serves to prevent the flow of absorption liquid into the auxiliary vessel P while permitting the flow of liquid propane into that vessel, as will be apparent from the consideration of the operation of the system described hereinafter.

A small heater which may be in the form of an electric cartridge, as indicated as 8, is placed in the lower portion of the auxiliary vessel P. This heater serves to vaporize liquid propane fed into the vessel through the conduit 1.

The parts of the system other than those described in detail above are similar to those disclosed in my Patent #1,822,109. Assuming the system is charged with ammonia, propane and water, the generator G serves to expel ammonia from the absorption solution, an electric cartridge heater 14 supplying heat to the generator and also cooperating with the conduit 15, gas lift pump coil 16 and conduit 17 to cause circulation of the absorption liquid. The ammonia gas expelled in the generator passes upwardly through the rectifier R and is conveyed by a conduit 21 to the condenser C from which it flows as a liquid through the conduit 24 into evaporator E.

The weakened absorption liquid leaves the lower portion of the generator G through the conduit 23, passes through the heat exchanger H and into the absorber through the conduit 44. Having absorbed a quantity of ammonia in the absorber A, the strong absorption liquid passes through the conduit 15, the heat exchanger H and back to the generator.

The evaporator is so designed as to permit the simultaneous evaporation of two refrigerants. For a detailed description of this evaporator reference may be had to my Patent #1,844,136 granted Feb. 9, 1932, entitled "Evaporator for refrigerating systems". Ammonia is supplied to the evaporator by the conduit 24, as mentioned above, while propane is supplied to it from the condenser C2 through the conduit 25. As ammonia and propane evaporate in the evaporator E they absorb heat and thus produce a cooling effect. The vaporized refrigerants pass downwardly through the conduit 35 and enter the absorber at the lower portion thereof. As the ammonia and propane pass upwardly through the water-cooled absorber the ammonia is absorbed. This causes the propane to condense. Since propane is immiscible with and much lighter than liquid ammonia or a solution of ammonia and water, the propane condensed in the absorber rises to the top thereof and flows upwardly through the pipe 1 into the auxiliary vessel P. Due to the application of heat to this vessel by the heating element 8, the propane is again vaporized and flows upwardly through the conduit 41 to the condenser C2, thus completing its cycle.

The liquid levels in the generator G, absorber A and auxiliary vessel P are normally as indicated by the dotted line, the solution level being indicated at XX and the liquid propane level at YY. With the liquids at these levels the valve assembly is approximately in the position shown, that is, neither the valve 5 nor the valve 6 is closed. The weight of the valve assembly is such as to tend to close the valve 5 in this position, but it is apparent that if this valve closes temporarily it almost immediately opens again due to the fact that propane collecting in the absorber A causes a slight increase in the level XX in the generator G thus increasing the pressure on the valve 5 and causing it to open again.

Now, if the conditions become such that the liquids in the absorber A and vessel P tend to recede from the positions indicated, as often occurs in apparatus of this nature, due to changes in temperature or pressure in various parts of the system, the valve 5 immediately closes and prevents the flow of liquid propane from the auxiliary vessel P back into the absorber.

On the other hand, if the level of the absorption solution in absorber A rises above the level indicated, the valve 6 closes and prevents the flow of absorption liquid into the auxiliary vessel P. It is important to prevent absorption liquid from entering the vessel P, for if the solution comes in contact with the heating element 8, ammonia will be expelled into the propane condenser C2 and cause the apparatus to go out of operation, at least temporarily.

With the arrangement shown it is possible to effectively separate the ammonia from the propane in the absorber while maintaining the entire absorber at as low a temperature as is possible with the cooling medium available. Thus cooling water may be passed through the coil 40 around the entire absorber.

In describing the apparatus illustrated, it has been presumed that ammonia and propane were the refrigerants employed. It is clear, however, that the present invention is not limited to the use of these substances. If the auxiliary refrigerant is heavier than the solution of the main refrigerant, the auxiliary vessel P would naturally be located beneath instead of above the absorber.

The vessel P should preferably be spaced slightly from the absorber so as to prevent the heat supplied by the heater 8 from materially affecting conditions in the absorber, but it is of course within the purview of the invention to construct these two devices by partitioning a single structure. Also, if the room temperature is high compared to the temperature of the cooling water, it may be necessary to supply only a slight amount of heat, if any, to the vessel P by means of the heater 8, since heat will then be supplied to this vessel by the atmosphere.

While only one embodiment of the invention has been shown and described herein, it is obvious that various changes may be made in the arrangement and construction of the various parts without departing from the spirit of the invention, or the scope of the annexed claims.

I claim:—

1. In an absorption refrigerating system employing two immiscible refrigerants of different specific gravity, an absorber, means for supplying the two refrigerants in gaseous phase thereto, means for circulating an absorption liquid through said absorber to absorb one of said refrigerants therein and cause the other to condense and separate from the absorbed refrigerant by gravity action, a vessel located above said absorber for vaporizing the condensed refrigerant, a conduit connecting the upper portion of said absorber to the lower portion of said vessel, valve seats in said conduit, valves cooperating with said seats, means for actuating said valves and a control device responsive to the levels of absorption liquid and condensed refrigerant for closing one of said valves to prevent the flow of liquid from said absorber to said vessel when the absorption liquid rises above a predetermined level, and for closing another of said valves to prevent the flow of liquid from said vessel to said absorber, when the liquid levels in said absorber recede from a predetermined level.

2. In an absorption refrigerating system employing two immiscible refrigerants, an absorber, means for supplying the two refrigerants in gaseous phase thereto, means for circulating an absorption liquid through said absorber to absorb one refrigerant and cause the other to condense therein and separate from the absorption liquid by gravity action, an auxiliary device associated with said absorber for vaporizing the refrigerant condensed in said absorber and means for conducting the condensed refrigerant from said absorber to said device and for preventing the flow of absorption liquid from said absorber to said device.

3. In an absorption refrigerating system employing two immiscible refrigerants, an absorber, means for supplying the two refrigerants in gaseous phase thereto, means for circulating an absorption liquid by gravity action, an auxiliary device associated with said absorber for vaporizing the refrigerant condensed in said absorber, means for conducting the condensed refrigerant from said absorber to said device, means for preventing the flow of absorption liquid from said absorber to said device and means for preventing the flow of condensed refrigerant from said device to said absorber.

4. In an absorption refrigerating system employing a plurality of refrigerants, an absorber, means for supplying refrigerants in gaseous phase thereto, means for circulating an absorption liquid through said absorber to absorb one refrigerant therein and cause another to condense and separate from the absorption liquid, a vessel located near said absorber for vaporizing the condensed refrigerant, means for conducting the condensed refrigerant from the absorber to said vessel and means for preventing the flow of absorption liquid to said vessel.

5. In an absorption refrigerating system employing a plurality of refrigerants, an absorber, means for supplying refrigerants in gaseous phase thereto, means for circulating an absorption liquid through said absorber to absorb one refrigerant therein and cause another to condense and separate from the absorption liquid, a vessel located near said absorber for vaporizing the condensed refrigerant, means for conducting the condensed refrigerant from the absorber to said vessel and means for preventing the flow of absorption liquid to said vessel, said last mentioned means comprising a valve and a float member so arranged as to close said valve when an excess of a predetermined amount of absorption liquid collects in said absorber and open said valve when a sufficient quantity of said condensed refrigerant collects in said absorber.

6. In an absorption refrigerating system employing a plurality of refrigerants, an arrangement for converting two gaseous refrigerants from a mixture to a gaseous state in which each is substantially separated from the other comprising means for conveying the gaseous mixture into the presence of a liquid which will absorb one of said refrigerants and thereby cause the other to condense, means to separate the condensed refrigerant from the absorption liquid, means for expelling the absorbed refrigerant from the absorption liquid, separate means for vaporizing the condensed refrigerant and means for preventing absorption liquid from passing into said condensed refrigerant vaporizing means.

7. In an absorption refrigerating system, an absorber, means for causing two immiscible liquids to stratify therein and means for separating said liquids, said last mentioned means including a conduit having a valve therein and a device responsive to a change in the liquid levels of one of said liquids for actuating said valve whereby one liquid may flow through said conduit and the other may be prevented from flowing therethrough.

8. In an absorption refrigerating system adapted to employ ammonia and propane as refrigerants, an absorber, means for supplying a mixture of gaseous ammonia and gaseous propane thereto, means for causing an absorption liquid to flow through the absorber to absorb the ammonia and cause the propane to condense and float on top of the ammonia solution, a conduit for conducting the propane away from the absorber, a valve in said conduit and means responsive to the level of the absorption liquid for closing said valve when the absorption liquid rises above a predetermined level to prevent absorption liquid from flowing through said propane conduit.

9. In the art of absorption refrigeration, the method of converting two gaseous refrigerants from a mixture to a gaseous state in which each is substantially separated from the other, said method including the steps of conveying the gaseous mixture into the presence of a liquid which will absorb one of said refrigerants thereby causing the other refrigerant to condense, separating the condensed refrigerant from the absorption liquid, by gravity action and by controlling the flow of condensed refrigerant away from the absorption liquid and preventing absorption liquid from flowing with said condensed refrigerant, vaporizing the condensed refrigerant by the application of heat thereto and expelling the absorbed refrigerant from the absorption liquid.

10. In an absorption refrigerating system, an evaporator wherein two immiscible refrigerants evaporate, an absorber, means for conveying the evaporated refrigerants from the evaporator to the absorber, means including a device responsive to fluctuations in fluid levels in the absorber, for separating portions of said refrigerants and for maintaining portions thereof separated and means for returning the separated portions of the refrigerants to the evaporator.

11. In the art of continuous absorption refrigeration, the method including the steps of continuously bringing two fluids in liquid phase into the presence of each other and causing both to evaporate thereby taking up heat from the surroundings, continuously conveying the vapor mixture so formed out of the presence of the portions in liquid phase, liquefying one of said fluids, separating the fluids by permitting or blocking the flow of the fluids in response to fluctuations in fluid levels, liquefying the other of said fluids and again bringing the fluids in their liquid phases into the presence of each other.

12. In a refrigerating apparatus, an evaporator means for conveying two fluids in liquid phase into the evaporator to cause both fluids to evaporate therein and take up heat from the surroundings, means for conveying the vapor mixture so formed out of the evaporator, liquefying one of the fluids, mechanically operating separating means for separating the liquefied fluid from the other fluid, means for liquefying said other fluid after it has been separated from the fluid first liquefied and means for again conveying the fluids in their liquid phases into the presence of each other.

RUDOLPH S. NELSON.